United States Patent
Leica et al.

(10) Patent No.: US 8,433,335 B2
(45) Date of Patent: Apr. 30, 2013

(54) METHOD AND APPARATUS FOR SHARING INFORMATION FROM A COMMUNICATION DEVICE

(75) Inventors: Marcel F. Leica, Mississauga (CA); Yevgeny Bondar, Mississauga (CA); Alexander Sherkin, Mississauga (CA); Laura Brindusa Fritsch, Redwood City, CA (US)

(73) Assignee: Research In Motion Limited, Waterloo (CA)

( * ) Notice: Subject to any disclaimer, the term of this patent is extended or adjusted under 35 U.S.C. 154(b) by 315 days.

(21) Appl. No.: 12/827,715

(22) Filed: Jun. 30, 2010

(65) Prior Publication Data

US 2012/0003988 A1    Jan. 5, 2012

(51) Int. Cl.
*H04M 3/00* (2006.01)
*H04W 24/00* (2009.01)

(52) U.S. Cl.
USPC .............. 455/456.1; 455/418; 455/456.3; 455/456.5

(58) Field of Classification Search ............ 455/41.2, 455/422.1, 423–425, 404.2, 418–420, 456.1–456.6, 455/457, 466, 550.1, 556.2, 517, 433–434, 455/560–561; 701/447, 451, 482; 709/203, 709/226, 228–229, 218–219
See application file for complete search history.

(56) References Cited

U.S. PATENT DOCUMENTS

| | | | |
|---|---|---|---|
| 5,802,314 A * | 9/1998 | Tullis et al. | 709/246 |
| 6,321,092 B1 * | 11/2001 | Fitch et al. | 455/456.5 |
| 6,714,865 B2 | 3/2004 | Angwin et al. | |
| 6,750,813 B2 | 6/2004 | Vargas-Hurlston et al. | |
| 7,139,820 B1 * | 11/2006 | O'Toole et al. | 709/223 |
| 7,272,401 B2 | 9/2007 | Kim et al. | |
| 7,317,910 B2 | 1/2008 | Niemenmaa et al. | |

(Continued)

FOREIGN PATENT DOCUMENTS

| WO | 2008061042 | 5/2008 |
|---|---|---|
| WO | 2010091887 | 8/2010 |

OTHER PUBLICATIONS

Zhuang Z; Kim K-H; Singh J P: "Improving energy efficiency of location sensing on Smartphones". MOBISYS'10—Proceedings of the 8th International Conference on Mobile Systems, Applications, and Services, Jun. 18, 2010, XP002599758 ISBN: 978-1-60558-985-5, abstract, p. 1-p. 7.

(Continued)

*Primary Examiner* — Meless Zewdu
(74) *Attorney, Agent, or Firm* — Novak Druce Connolly Bove + Quigg LLP

(57) ABSTRACT

Provided is a method and apparatus for sharing information from a communication device. The communication device is to send first information to a first apparatus and second information to a second apparatus. In accordance with an embodiment of the application, the communication device combines the first information and the second information in a single message and then sends the message to a network node. In accordance with another embodiment of the application, the network node separates the first information from the second information and sends the first information and the second information to the first apparatus and the second apparatus, respectively. Note that the communication device did not have to send separate messages to the apparatuses and therefore there is a reduction in number of messages sent by the communication device. This reduction has an effect of reducing network utilization by the communication device.

20 Claims, 11 Drawing Sheets

U.S. PATENT DOCUMENTS

| | | | |
|---|---|---|---|
| 7,346,618 B2 * | 3/2008 | Himeno ............................... | 1/1 |
| 7,386,318 B2 | 6/2008 | Moon et al. | |
| 7,505,482 B2 | 3/2009 | Adamczyk et al. | |
| 7,536,695 B2 | 5/2009 | Alam et al. | |
| 7,640,288 B2 | 12/2009 | Yao et al. | |
| 7,877,454 B1 * | 1/2011 | Hunter ........................ | 709/207 |
| 2002/0143930 A1 | 10/2002 | Babu et al. | |
| 2005/0043038 A1 | 2/2005 | Maanoja et al. | |
| 2005/0282557 A1 | 12/2005 | Mikko et al. | |
| 2008/0181220 A1 | 7/2008 | Babbar et al. | |
| 2008/0189028 A1 | 8/2008 | Nair et al. | |
| 2008/0274752 A1 * | 11/2008 | Houri ......................... | 455/456.1 |
| 2009/0164772 A1 | 6/2009 | Karkaria et al. | |
| 2009/0209267 A1 | 8/2009 | Jagetiya | |
| 2010/0279712 A1 * | 11/2010 | Dicke et al. ................ | 455/456.5 |
| 2010/0325194 A1 * | 12/2010 | Williamson et al. .......... | 709/203 |
| 2011/0060807 A1 * | 3/2011 | Martin et al. ................. | 709/217 |

OTHER PUBLICATIONS

Open Geospatial Constortium Inc: "OGC Location Services: Tracking Service Interface Standard" Open Geosptation Constortium Inc, Sep. 30, 2008, XP002599759, p. 1-p. 7, p. 30, p. 31.

Extended European Search Report dated Sep. 20, 2010 which issued on corresponding European Patent Application No. 10168034.6.

Chih-Hsiung Tseng et al., "Location management scheme with WLAN positioning algorithm for integrated wireless networks", http://www.sciencedirect.com/, Dec. 2008, Journal of Computer Communications, issue 18, vol. 31, total of 1 page; retreived Feb. 10, 2010.

Schilit, Bill N. et al., "Disseminating Active Map Information", http://citeseerx.ist.psu.edu/viewdoc/summary?doi=10.1.1.49.1499, Sep. 1994, total of 23 pages.

* cited by examiner

METHOD AND APPARATUS FOR SHARING INFORMATION FROM A COMMUNICATION DEVICE

FIELD OF THE DISCLOSURE

This disclosure relates to communication devices, and more particularly to sharing information from a communication device.

BACKGROUND

A location-based service (LBS) is an information and entertainment service that makes use of the geographical position of one or more mobile devices. Some applications involve tracking the geographic location of one or more mobile devices. In order to track the location of a mobile device, the mobile device sends location based information from which the geographical location of the mobile device can be determined. The mobile device might generate the location based information using GPS technology or by other means.

The mobile device might send the location based information from time to time to multiple apparatuses such as application servers for example. Alternatively, or additionally, the mobile device might send other type of information from time to time to multiple apparatuses. The information might be provided rather frequently depending on the application. Unfortunately, this can involve a lot of messaging. Excessive messaging can be costly in terms of network utilization and power consumption for the mobile device.

BRIEF DESCRIPTION OF THE DRAWINGS

Embodiments will now be described with reference to the attached drawings in which.

DETAILED DESCRIPTION OF EMBODIMENTS

Figure 1:
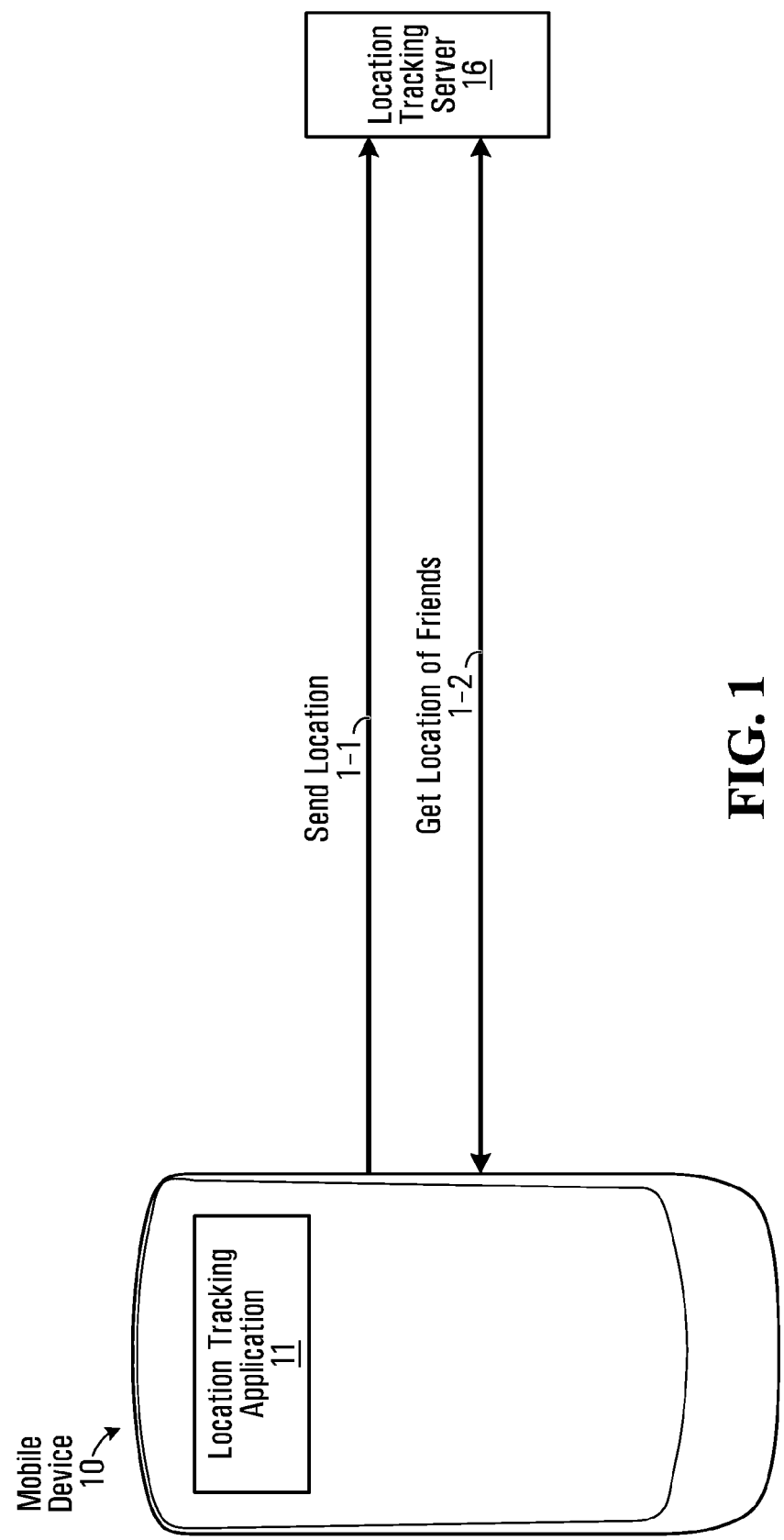
FIG. 1 is a block diagram of a system featuring end to end location sharing between a mobile device and an application server.

According to a broad aspect, there is provided a method for execution in a communication device, the method comprising: obtaining first information to be sent to a first apparatus; obtaining second information to be sent to a second apparatus when required by the second apparatus; combining the first information and any second information into a message; and sending the message to a network node.

According to another broad aspect, there is provided a non-transitory computer readable medium having computer executable instructions stored thereon for execution on a processor of a communication device so as to implement the method summarised above.

According to another broad aspect, there is provided a communication device comprising: a processor; and an information updater configured for: obtaining first information to be sent to a first apparatus; obtaining second information to be sent to a second apparatus when required by the second apparatus; combining the first information and any second information into a message; and sending the message to a network node.

According to another broad aspect, there is provided a method for execution in a network node, the method comprising: receiving a message from a communication device, the message comprising first information for a first apparatus and second information when required by a second apparatus; separating the first information from any second information; sending the first information to the first apparatus; and sending any second information to the second apparatus.

According to another broad aspect, there is provided a non-transitory computer readable medium having computer executable instructions stored thereon for execution on a processor of a network node so as to implement the method summarised above.

According to another broad aspect, there is provided a network node comprising: a processor; and a data distributor configured for: receiving a message from a communication device, the message comprising first information for a first apparatus and second information when required by a second apparatus; separating the first information from the second information; sending the first information to the first apparatus; and sending any second information to the second apparatus.

Other aspects and features of the present disclosure will become apparent, to those ordinarily skilled in the art, upon review of the following description of the specific embodiments of the invention. It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

Referring now to FIG. 1, shown is a block diagram of a system featuring end to end location sharing between a mobile device 10 and an application server 16. In this example, it is assumed that the application server 16 is a location tracking server 16 and the mobile device 10 has a location tracking application 11 for communicating with the location tracking server 16. The location tracking application 11 might for example be a web-based application. Other applications and associated application servers are possible as will be described in subsequent examples.

The operation of the system will now be described by way of example. For this example, it is assumed that the location of the mobile device 10 is being tracked by other devices (not shown) via the location tracking server 16. Therefore, the location tracking application 11 operates to send location based information to the location tracking server 16 as indicated at 1-1. The location tracking server 16 subsequently provides the location based information to the other devices that are tracking the location of the mobile device 10. The location based information enables the other devices to determine the geographical location of the mobile device 10.

For this example, it is also assumed that the location tracking application 11 is tracking the location of the other devices (not shown) via the location tracking server 16. The other devices, much like the mobile device 10, provide location based information to the location tracking server 16. The mobile device 10 receives the location based information of the other devices as indicated at 1-2. The location based information enables the location tracking application 11 to determine the geographical location of the other devices.

The messaging indicated at 1-1 and 1-2 might occur from time to time. As used throughout this disclosure, messaging "from time to time" generally refers to messaging that continues for some time such that multiple messages are sent in a periodic or non-periodic manner. Since the location sharing is between the mobile device 10 and only one application server 16, the amount of messaging may not be a cause for concern. However, the amount of messaging increases with the addition of applications and associated application servers. An example of this is described below with reference to FIG. 2.

Figure 2:
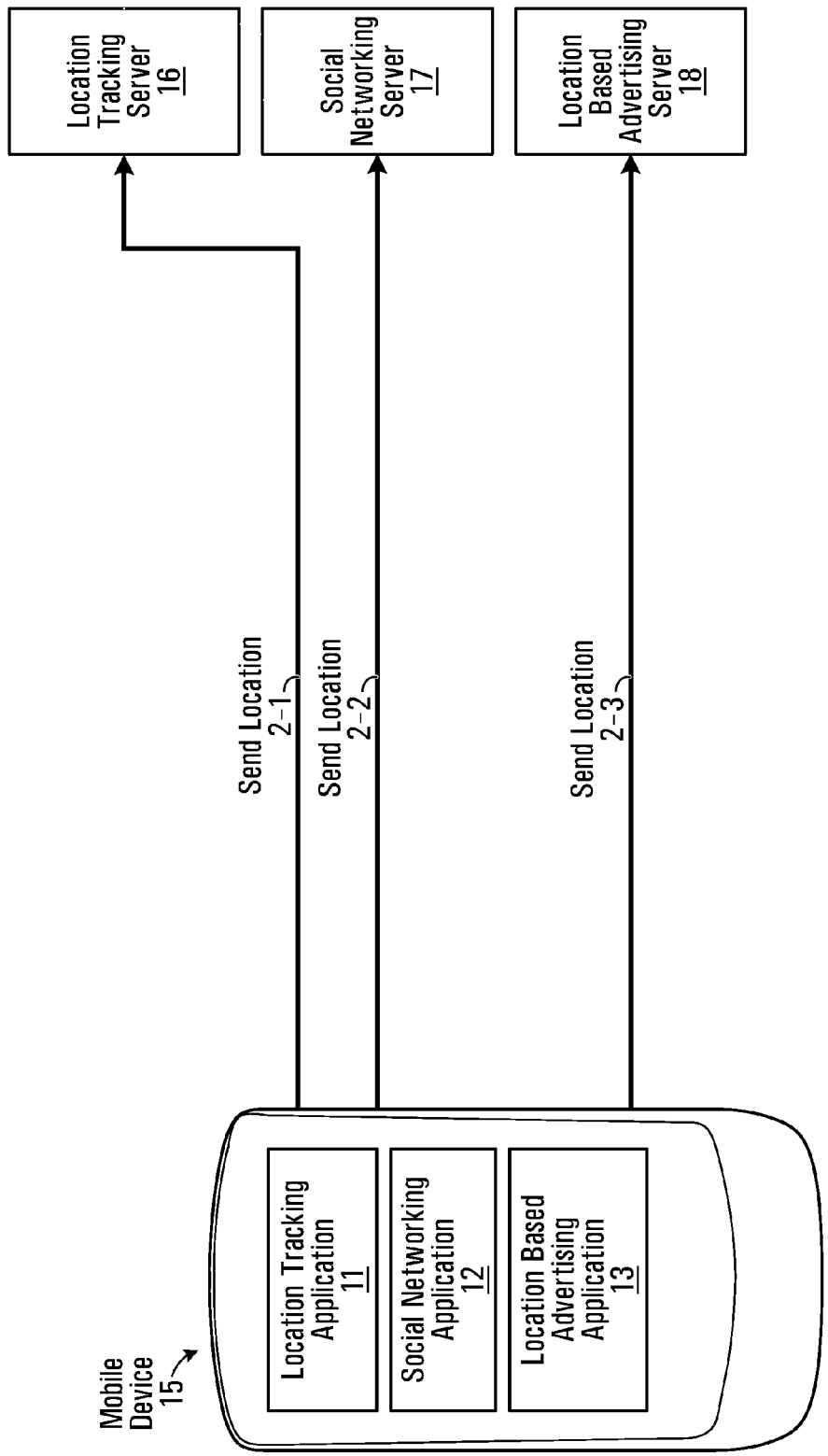
FIG. 2 is a block diagram of a system featuring end to end location sharing between a mobile device and multiple application servers.

Referring now to FIG. 2, shown is a block diagram of a system featuring end to end location sharing between a mobile device 15 and multiple application servers 16,17,18. In this example, it is assumed that the multiple application servers 16,17,18 include the location tracking server 16, a social networking server 17, and a location based advertising server 18. It is also assumed that the mobile device 15 has the location tracking application 11 for communicating with the location tracking server 16, a social networking application 12 for communicating with the social networking server 17, and a location based advertising application for communicating with the location based advertising server 18. The multiple applications 11,12,13 might for example be web-based applications. Other applications and associated application servers are possible.

The operation of the system will now be described by way of example. For this example, it is assumed that each application 11,12,13 operates to send location based information to each respective application server 16,17,18. Note that the location based information might be provided for different purposes depending on the application. For example, whilst the location tracking application 11 might operate to send location based information to the location tracking server 16 as indicated at 2-1 for location tracking purposes as similarly described with reference to FIG. 1, the location based advertising application 13 might operate to send location based information to the location based advertising server 18 as indicated at 2-3 in order to receive advertisements (e.g. promotional offers) specific to the geographic location of the mobile device 15. The social networking application 12 might operate to send location based information to the social networking server 17 as indicated at 2-2 for social networking purposes. The messages sent from the mobile device 15 are received by a wireless network (not shown) and delivered to the application servers 16,17,18.

In some implementations, the location based information is application server-specific. In other words, the location based information sent to the location tracking server 16 as indicated at 2-1 concerns the location of the mobile device 15 in a manner that is specific to the location tracking server 16. Similarly, the location based information sent to the social networking server 17 as indicated at 2-2 concerns the location of the mobile device 15 in a manner that is specific to the social networking server 17. This means that the location based information sent to the location tracking server 16 might be different from the location based information sent to the social networking server 17 even though they both concern the location of the mobile device 15.

There are many ways in which the location based information can be application server-specific. In some implementations, location based information being sent may be different for each application server 16,17,18 according to their specific needs for granularity of location. For example, the location tracking server 16 might require only city level granularity (e.g. I'm in Waterloo now), whereas the location based advertising server 18 might require precise GPS coordinates to determine relevant promotional offers within a certain area of interest (e.g. four blocks from my current location in either direction). In some implementations, location based information being sent may be different for each application server according to their specific needs for contextual information. For example, location based information sent to the social networking server 17 might include status information along with location based information in each update. In a specific example, a first update might include "looking for a place to watch the World Cup, location, timestamp" while a second update includes "found a great pub, location, timestamp." In some implementations, for each application server, the location based information is encrypted in a manner that can be decoded only by that application server. The manner in which the encryption is performed is application server-specific. However, note that this does not preclude similarities in the manner in which the location based information is encrypted for each application server 16,17,18.

The multiple application servers 16,17,18 might also provide information back to the mobile device 15. For instance, the location tracking server 16 and the social networking server 17 might provide location based information of other devices (not shown) that the mobile device 15 is tracking. The location based advertising server 18 might provide other information to the mobile device 15, for example automated location based advertisements as described above. However, this is not shown in the drawing.

In some implementations, each application 11,12,13 creates a connection to its corresponding application server 16,17,18 component and reports the location based information at a predefined interval. Therefore, the messaging as indicated at 2-1 through 2-3 occurs from time to time. When the applications 11,12,13 report location based information individually, the transmission of data over the network is not coordinated for minimizing radio usage. Since the location sharing involves multiple application servers 16,17,18, the amount of messaging might be a cause for concern. This is because excessive messaging can be costly in terms of network utilization and power consumption for the mobile device. Also, running the multiple applications 11,12,13 in the background, which might individually determine the location of the mobile device 15 (e.g. via querying a GPS receiver), also adds scheduling and GPS usage overhead that affects battery life.

Apparatus for Information Sharing

Figure 3:
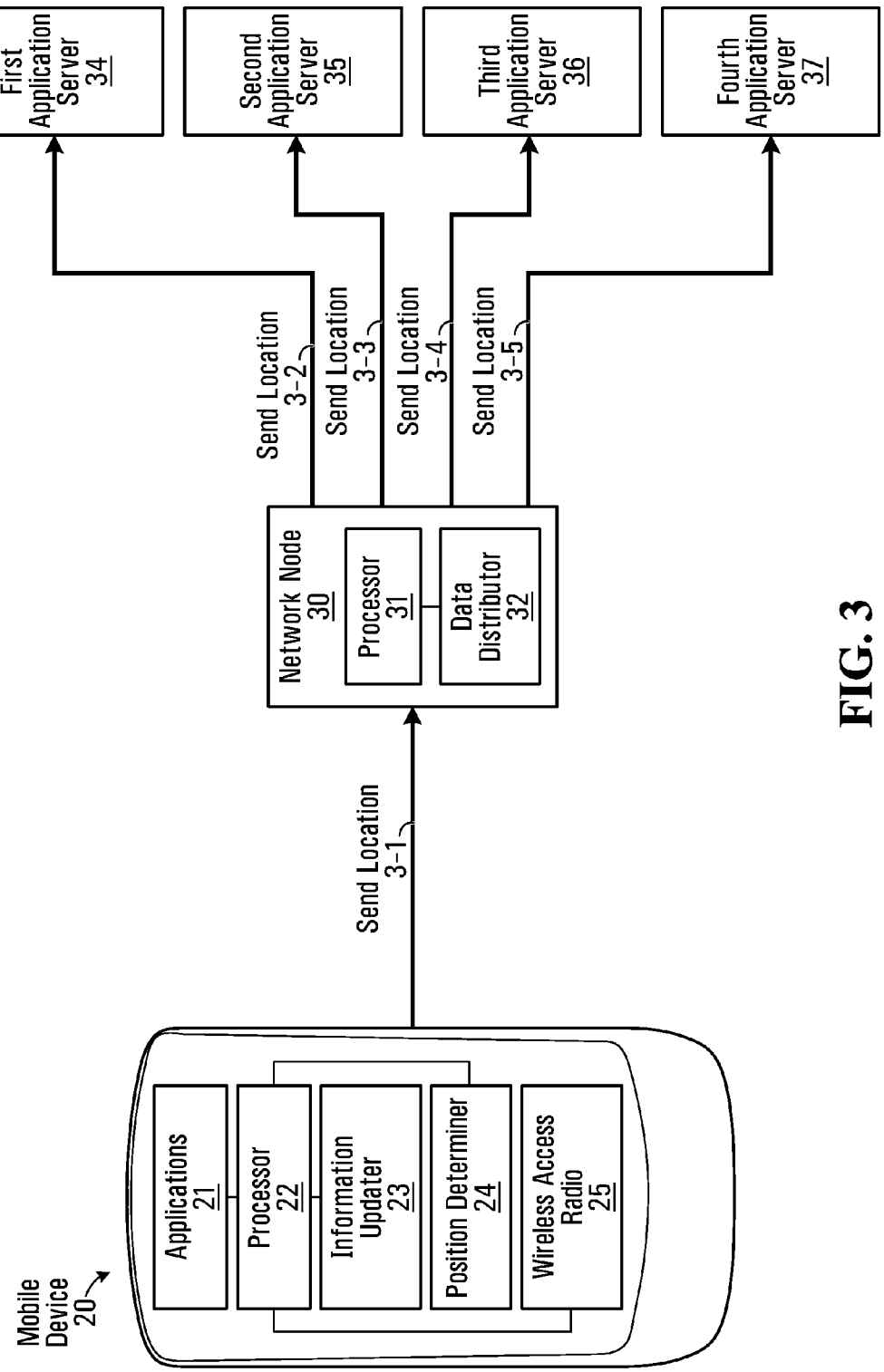
FIG. 3 is a block diagram of a system featuring centralized location sharing between a mobile device and multiple application servers.

Referring now to FIG. 3, shown is a block diagram of a system featuring centralized location sharing between a mobile device 20 and multiple application servers 34,35,36, 37. The mobile device 20 has applications 21, a processor 22, an information updater, a position determiner 24, a wireless access radio 25, and may have other components that are not shown. The centralized location sharing involves a network node 30, which has a processor 31, a data distributor 32, and may have other components that are not shown.

The operation of the system will now be described by way of example. For this example, it is assumed that the mobile device 20 is to send location based information to the application servers 34,35,36,37 from time to time. In some implementations, the location based information is sent on behalf of the applications 21, examples of which have been described above with reference to FIG. 2. The location of the mobile device 20 is determined using the position determiner 24, which might for example use GPS technology. Other implementations are possible as will be discussed below. More generally, the mobile device 20 obtains location based information to be sent to the application servers 34,35,36,37. As noted above with reference to FIG. 2, sending individual messages to multiple application servers from time to time can involve a lot of messaging. Excessive messaging can be costly in terms of network utilization and power consumption for the mobile device.

In accordance with an embodiment of the application, for at least some messaging, the information updater 23 combines (i.e. multiplexes) the location based information for multiple application servers in a single message to be sent to the network node 30. For example, the information updater 23 might combine first location based information to be sent to the first application server 34 with second location based information to be sent to the second application server 35 in a single message. The message is then sent to the network node 30 as indicated at 3-1. The message might for example be sent over the air using the wireless access radio 25. The message is received by a wireless network (not shown) and delivered to the network node 30.

In accordance with another embodiment of the application, upon the network node 30 receiving a message that combines the location based information for multiple application servers, the data distributor 32 separates (i.e. de-multiplexes) the location based information from one another and then sends each location based information to its respective application server. According to the foregoing example, the information updater 23 would separate the first location based information to be sent to the first application server 34 from the second location based information to be sent to the second application server 35. The information updater 23 would then send the first location based information without the second location based information to the first application server 34 as indicated at 3-2, and send the second information without the first location based information to the second application server 35 as indicated at 3-3.

Note that by combining the location based information for multiple application servers in a single message, the number of messages sent from the mobile device 20 is reduced. According to the foregoing example, the mobile device 20 sends a single message in order to send the first location based information to the first application server 34 and the second location based information to the second application server 35. The mobile device 20 did not have to send two individual messages and therefore there is a reduction in the number of messages sent over the air by the mobile device 20. This reduction has an effect of reducing network utilization by the mobile device. As will be shown later with reference to FIGS. 8, 9A and 9B, this can lead to savings in terms of battery life as well as savings in terms of billable wireless data. In alternative embodiments, a plurality of messages is used (e.g. in a stream of packet communication), but there is still nonetheless the step of combining location information. More generally, information is combined into one or more messages.

In some implementations, for each message that combines the location based information for multiple application servers, the location of the mobile device 20 is determined only once. For example, the information updater can query the position determiner 24 only once for each message that is sent. By contrast, as described above with reference to FIG. 2, allowing the multiple applications 11,12,13 to individually determine the location of the mobile device 15 can add scheduling and GPS usage overhead that affects battery life. In alternative implementations, for each message that combines the location based information for multiple application servers, the location of the mobile device 20 is determined for each application server being updated. Other implementations are possible.

It is to be understood that location based information might also be sent to the third application server 36 as indicated at 3-4 and/or the fourth application server 37 as indicated at 3-5. In some implementations, each message sent from the mobile device 20 includes location based information for only those application servers that need the location based information at the time of the message. Thus, the application servers 34,35,36,37 receive location based information only as it is needed. This implementation will be described in further detail below with reference to FIG. 6. In alternative implementations, each message sent from the mobile device 20 includes location based information for every application server 34,35,36,37. Other implementations are possible.

In the illustrated example, the mobile device 20 is able to communicate wirelessly with the network node 30 via the wireless access radio 25. In some implementations, the network node 30 forms part of the wireless network (not shown). The wireless network would have any appropriate components suitable for wireless communication. Note that the wireless network may include wires in spite of having components for wireless communication. The components of the wireless network are implementation specific and may depend on the type of wireless network. The wireless network might for example be a cellular network or a WiFi network. Various technologies such as CDMA, GSM, etc. can be employed. Other wireless networks and technologies are possible and are within the scope of this disclosure.

In some implementations, the location based information is application server-specific. In other words, the first location based information sent to the first application server 34 as indicated at 3-2 concerns the location of the mobile device 20 in a manner that is specific to the first application server 34. Similarly, the second location based information sent to the second application server 35 as indicated at 3-3 concerns the location of the mobile device 20 in a manner that is specific to the second application server 35. This means that the first location based information sent to the first application server 34 might be different from the second location based information sent to the second application server 35 even though they both concern the location of the mobile device 20.

There are many ways in which the location based information can be application server-specific. In some implementations, location based information being sent may be different for each application server 34,35,36,37 according to their specific needs for granularity of location. An example of this has been described above with reference to FIG. 2. In some implementations, location based information being sent may be different for each application server according to their specific needs for contextual information. Examples of this has been described above with reference to FIG. 2. In some implementations, the location based information for each application server is encrypted in a manner that can be only decoded by that application server. The manner in which the encryption is performed is application server-specific. However, note that this does not preclude similarities in the manner in which the location based information is encrypted for each application server 34,35,36,37.

It is noted that the embodiments described with reference to FIG. 3 distinguish from multicasting location based information to the application servers 34,35,36,37 because the location based information is combined (i.e. multiplexed) by the mobile device 20 and then separated (i.e. de-multiplexed) by the network node. Those skilled in the art will understand that multicasting data does not involve the steps of combining (i.e. multiplexing) and separating (i.e. de-multiplexing). Rather, multicasting data involves providing an exact copy of the data to each recipient. The effect is that multicasting data does not allow the data to be application server-specific. By contrast, the location based information provided to each application server 34,35,36,37 can be application server-specific. For example, as noted above, in some implementations, the location based information is encrypted in a manner that is specific to that application server. Note that the application server-specific encryption might provide privacy and security of the location based information. Multicasting location based information would not be a suitable solution because it would not allow the location based information to be processed by the application servers 34,35,36,37, especially if the application servers 34,35,36,37 require application server-specific encryption. Note that since multicasting location based information would not support application server-specific encryption it may not provide the same privacy and security of location based information.

In the illustrated example, the information updater 23 is implemented as software and is executed on the processor 22. In specific implementations, the information updater 23 is a background device application (e.g. Location Updater Agent) for collecting and sending location based information to the network node 30 on behalf of the applications 21 (e.g. content provider location based applications). In specific implementations, a content provider device application registers with the Location Updater Agent for location reporting by providing an identification and reporting requirements. In specific implementations, the Location Updater Agent then requests permission from the user to start reporting location data for this application. The Location Updater Agent provides a common interface to the application servers 16,17,18,19 for the content provider location based applications. The common interface can enable easier development of content provider location based applications. The common interface can also enable a uniform experience in granting/revoking location access for the user, as well as a quick view of content provider location based applications.

More generally, the information updater 23 may be implemented as software, hardware, firmware, or any appropriate combination thereof. Although shown as a single component, more generally, the information updater 23 may have one or more components. The one or more components may be integrated with other components. Also, functionality of the information updater 23 might be combined with other components. For example, in alternative implementations, the information updater 23 and the applications 21 are combined as a single component. Other implementations are possible.

In the illustrated example, the data distributor 32 is implemented as software and is executed on the processor 31. However, more generally, the data distributor 32 may be implemented as software, hardware, firmware, or any appropriate combination thereof. Although shown as a single component, more generally, the data distributor 32 may have one or more components. The one or more components may be integrated with other components. Also, functionality of the data distributor 32 might be combined with other components.

In some implementations, the position determiner 24 includes a GPS receiver for determining the position of the mobile device 20. This involves receiving GPS signals from at least four GPS satellites (not shown). In other implementations, geographic location is determined based on cell/sector identification within a cellular network. In alternative implementations, geographic location is determined using triangulation of signals from in-range base towers, such as those used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Coarser location based information can be obtained not only by triangulating the device's position based on nearby cell towers but also based on nearby Wi-Fi access points via a WLAN radio. In alternative implementations, geographic location is determined based on bar codes. Each bar code is located in a predefined location and encodes location based information for that location. A mobile device, upon scanning/taking picture of one of these bar codes, can obtain the location based information. The bar codes can be 1-dimensional, or 2-dimensional. Other means for determining geographic location are possible and are within the scope of this disclosure.

Note that the nature and granularity of the location based information might depend on the means used for determining geographic location. There are many possibilities for the location based information. In some implementations, the location based information is presence information. In some implementations, the location based information includes coordinates of the geographic location of the mobile device 20 as determined using GPS technology. More generally, the location based information includes any suitable information from which the location of the mobile device 20 can be determined. Additionally, the location based information can include other information such as contextual data, e.g. user status for multiple instant-messaging systems.

The illustrated example assumes that location based information is distributed to the application servers 34,35,36,37. In alternative embodiments, any information is distributed to the application servers 34,35,36,37. Note that these alternative embodiments might not concern the location of the mobile device 20 at all. Rather, they more generally concern any sort of information that might be distributed to the application servers 34,35,36,37. For example, other personal data info (such as contextual data, e.g. user status for multiple instant-messaging systems) can be distributed using the same approach. As such, it is noted that the alternative embodiments are more generally applicable to a "communication device" that may or may not be mobile. It is noted that for non-mobile implementations there is no need for the communication device to have a wireless access radio or a position determiner.

It is to be understood that each application server 34,35, 36,37 can be any appropriate application server. Specific example application servers are shown in FIG. 2. Other application servers are possible and are within the scope of this disclosure. It is noted that each application server 34,35,36,37 might be a single application server, or be a network of a plurality of application servers. More generally, information is distributed to "apparatuses" which may or may not be application servers per se. Example apparatuses include application servers, mobile devices, and communication devices. Other apparatuses are possible and are within the scope of this disclosure.

Figure 4:
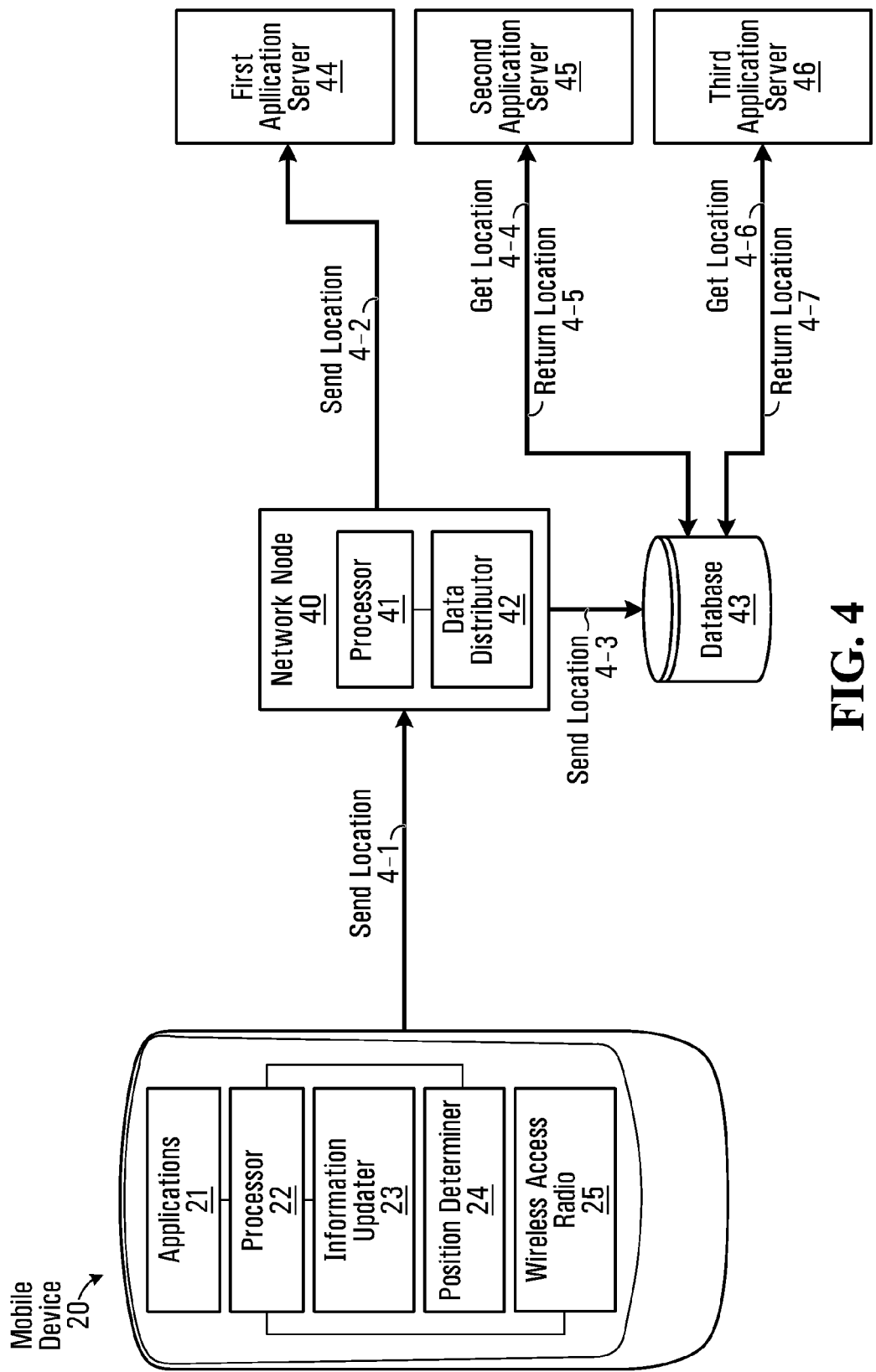
FIG. 4 is a block diagram of another system featuring centralized location sharing between a mobile device and multiple application servers.

Referring now to FIG. 4, shown is a block diagram of another system featuring centralized location sharing between the mobile device 20 and multiple application servers 44,45,46. The centralized location sharing involves a network node 40, which has a processor 41, a data distributor 42, and may have other components that are not shown. The centralized location sharing also involves a database 43, which might form part of the network node 40 or be separate from the network node 40 as depicted in the illustrated example.

The operation of the system will now be described by way of example. For this example, it is assumed that the mobile device 20 is to send location based information to the application servers 44,45,46 from time to time. The mobile device sends messages from time to time to the network node 40 as indicated at 4-1. This messaging is similar to the messaging 3-1 shown in FIG. 3 and therefore details are not repeated here. The centralized location sharing shown in FIG. 4 differs from the centralized location sharing shown in FIG. 3 in that the data distributor 42 of the network node 40 can send the location based information using any one of two methods: pushing method and polling method. In the illustrated example, location based information is sent to the first application server 44 using the pushing method as indicated at 4-2, and location based information is sent to the other application servers 45,46 as indicated at 4-3 through 4-7 using the polling method. Each of these methods will be described in greater detail below.

The pushing method involves sending location based information to the first application server 44 without any explicit request for the location based information. Therefore, the first application server 44 receives the location based information from time to time without having to request the location based information each time. This can keep the first application server 44 up to date with the location based information while reducing the number of messages used for such purpose.

The polling method involves storing the location based information in the database 43 as indicated at 4-3. As noted above, the database 43 might form part of the network node 40 or be separate from the network node 40 as depicted in the illustrated example. In either case, the database 43 stores the location based information so that at some later time the location based information can be retrieved upon request. In the illustrated example, the second application server 45 requests location based information as indicated at 4-4, and in response the location based information is returned as indicated at 4-5. Likewise, the third application server 46 requests location based information as indicated at 4-6, and in response the location based information is returned as indicated at 4-7.

In the illustrated example, the data distributor 42 is implemented as software and is executed on the processor 41. However, more generally, the data distributor 42 may be implemented as software, hardware, firmware, or any appropriate combination thereof. Although shown as a single component, more generally, the data distributor 42 may have one or more components. The one or more components may be integrated with other components. Also, functionality of the data distributor 42 might be combined with other components.

It is noted that the introduction of the network node 40 having the processor 41 and the data distributor 42 does not necessarily mean that location based information cannot be secured. For example, when using end to end encryption in which each application's location based information is encrypted with its own set of keys, the location based information travels securely in an "opaque manner" (i.e. components 40, 41 and 42 do not understand the location based information but know how to route it to the application servers). In alternative, implementations, Information can be processed or distributed in a transparent manner by the network node 40. Therefore, location based information can be understood and augmented by the network node 40. Note that this mode does not guarantee the privacy of the user's location based information. More generally, location based information may be sent/stored unencrypted or secured, or sent/stored in a "transparent" or "opaque" manner. The manner in which location based information is sent/stored is implementation specific.

Method for Information Sharing

Figure 5:
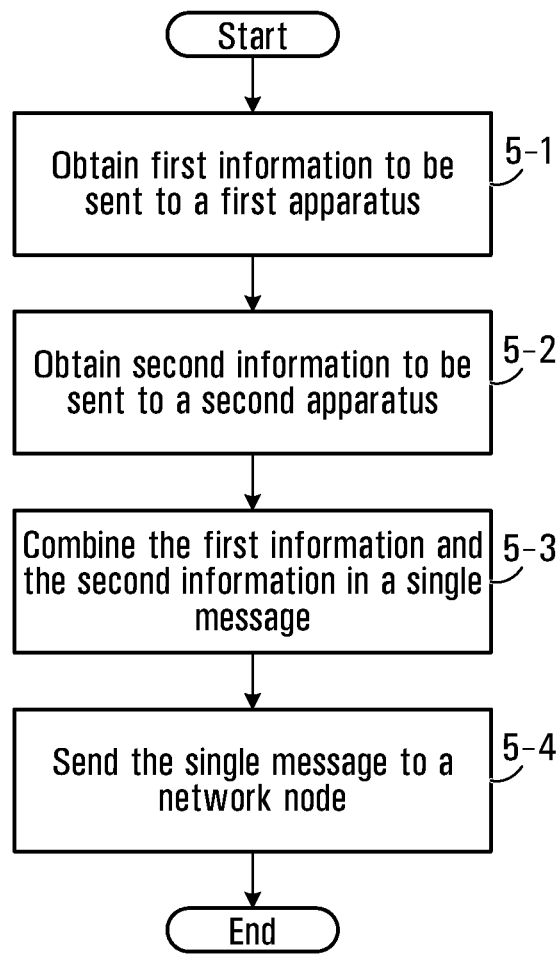
FIG. 5 is a flowchart of a method for a communication device to provide information to multiple apparatuses.

Referring now to FIG. 5, shown is a flowchart of a method for a communication device to provide information to multiple apparatuses. This method can be implemented by a communication device, for example by the information updater 23 of the mobile device 20 shown in FIGS. 3 and 4. More generally, this method can be implemented by any appropriately configured communication device including those that are not mobile.

At steps 5-1 and 5-2, the communication device determines or otherwise obtains first information to be sent to a first apparatus and second information to be sent to a second apparatus. In accordance with an embodiment of the application, at step 5-3 the communication device combines the first information and the second information in a single message. At step 5-4, the communication device sends the single message to a network node. The network node can then separate the first information from the second information and send the first information and the second information to the first apparatus and the second apparatus, respectively.

Note that the communication device did not have to send separate messages to the apparatuses and therefore there is a reduction in number of messages sent by the communication device. This reduction has an effect of reducing network utilization by the communication device. As will be discussed later with reference to FIGS. 8, 9A and 9B, for the case where the communication device is a mobile device, this can lead to savings in terms of battery life as well as savings in terms of billable wireless data.

In some implementations, the communication device is a mobile device and the first information and the second information concern the location of the mobile device in a manner that is specific to the first apparatus and the second apparatus, respectively. In specific implementations, the mobile device encrypts the location of the mobile device in an apparatus-specific manner. More generally, the communication device can be mobile or non-mobile, and the communication device determines or otherwise obtains any first information and any second information to be sent to the first apparatus and the second apparatus, respectively.

In some implementations, the communication device provides information to the first apparatus and the second apparatus from time to time. The first apparatus and the second apparatus might for example be two application servers of a plurality of application servers to which information is sent from time to time. In specific implementations, the communication device is a mobile device that determines its location on an ongoing basis and the first apparatus and the second apparatus are two application servers of a plurality of application servers to which location based information is sent from time to time. An example of this is described below with reference to FIG. 6. Other implementations are possible.

Figure 6:
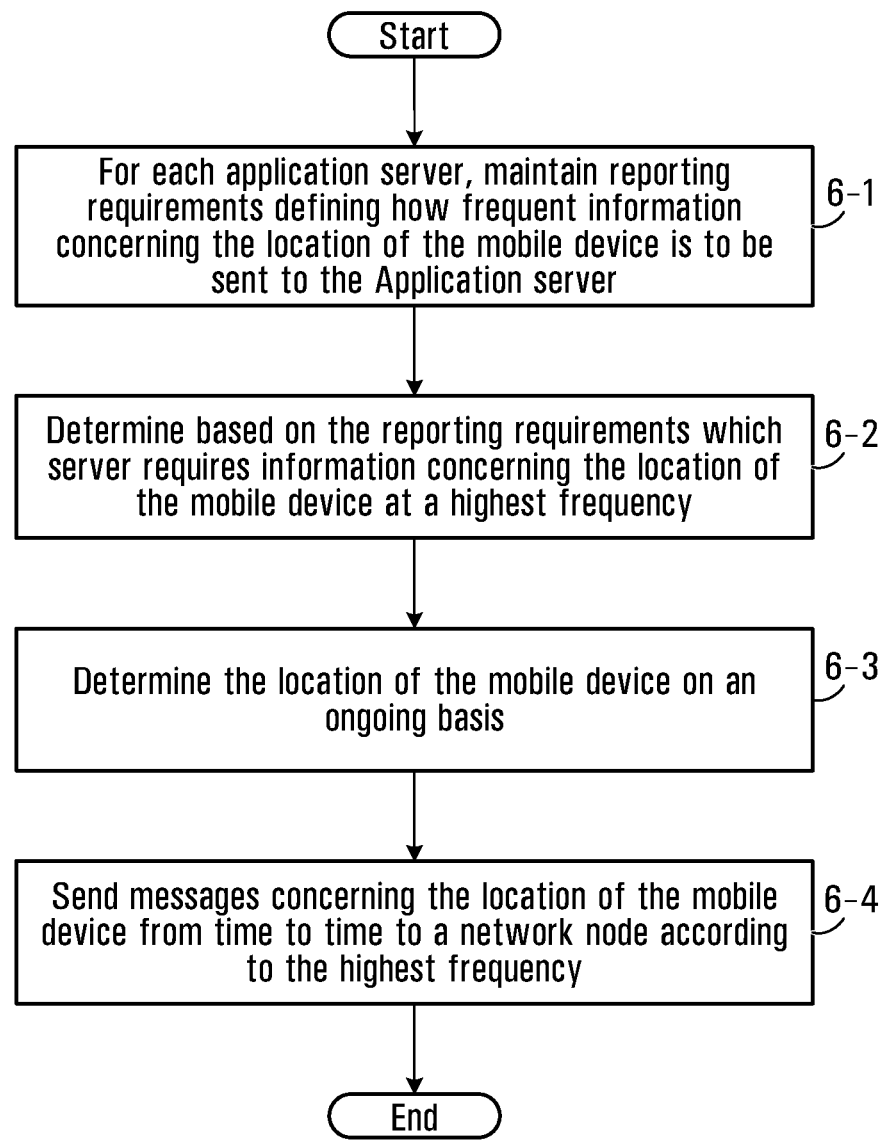
FIG. 6 is a flowchart of a method for a mobile device to provide location based information to multiple application servers.

Referring now to FIG. 6, shown is a flowchart of a method for a mobile device to provide information to multiple application servers. This method can be implemented by a mobile device, for example by the information updater 23 of the mobile device 20 shown in FIGS. 3 and 4. More generally, this method can be implemented by any appropriately configured mobile device.

At step 6-1, for each application server, the mobile device maintains reporting requirements defining how frequent information concerning the location of the mobile device is to be sent to the application server. The reporting requirements for each application server might for example be provided by an application that communicates with the application server or by the application server itself. At step 6-2, the mobile device determines based on the reporting requirements which application server requires information concerning the location of the mobile device at a highest frequency. At step 6-3, the mobile device determines its location on an ongoing basis. As used throughout this disclosure, determining location on "an ongoing basis" generally refers to determining location multiple times for some time in a periodic or non-periodic manner. This may or may not coincide with messaging "from time to time" as indicated above with reference to FIG. 3. Finally, at step 6-4 the mobile device sends messages concerning the location of the mobile device from time to time to a network node according to the highest frequency. The network node can then process each message as similarly described above with reference to FIG. 3 or FIG. 4.

In some implementations, each message includes information concerning the location of the mobile device in a manner that is specific to the application server that requires the information at the highest frequency. If there are any other application servers that according to the reporting requirements require information concerning the location of the mobile device at a time of the message, for each of those application servers, the message also includes information concerning the location of the mobile device in a manner that is specific to the application server. Therefore, each message includes location based information for each application server that according to the reporting requirements require the location based information at the time of the message. For example, if a first application expects updates to be sent every minute and a second application expects updates to be sent every 10 minutes, then there would be 9 updates containing the location based information for the first application and a $10^{th}$ update containing the combined location based information for both the first application and the second application.

In some implementations, each message further includes, for each application server that according to the reporting requirements require information concerning the location of the mobile device, an application server identifier and a user identifier. The application server identifier is used for identifying the application server while the user identifier is used for identifying the user. Alternative implementations are possible.

In accordance with another embodiment of the application, there is provided a non-transitory computer readable medium having computer executable instructions stored thereon for execution on a processor of a communication device so as to implement any of the methods described above with reference to FIG. 5 and/or FIG. 6. The non-transitory computer readable medium might for example be an optical disk (e.g. CD, DVD, BD), a memory stick, a disk drive, a solid state drive, etc.

Figure 7:
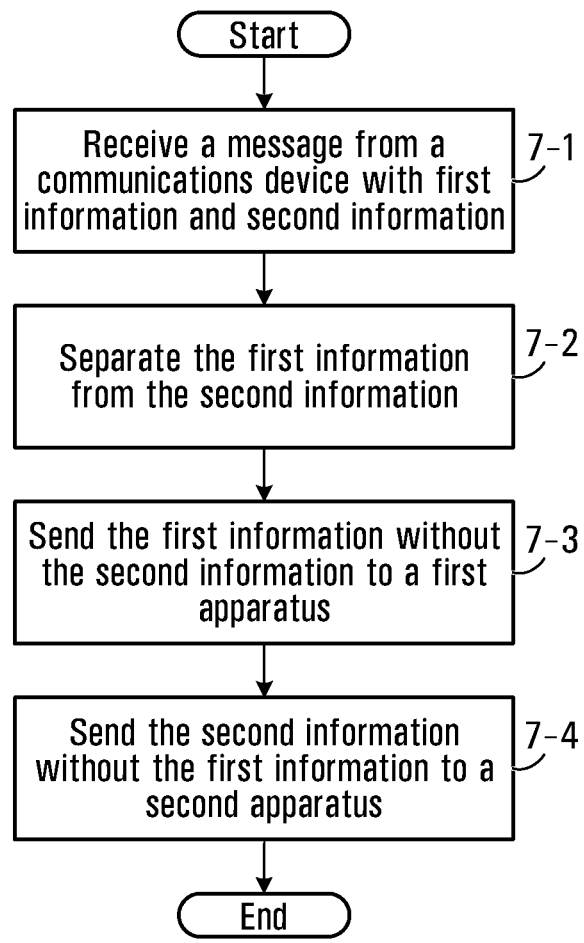
FIG. 7 is a flowchart of a method for a network node to provide information to multiple apparatuses.

Referring now to FIG. 7, shown is a flowchart of a method for a network node to provide information to multiple application servers. This method can be implemented by a network node, for example by the data distributor 32 of the network node 30 shown in FIGS. 3 and 4. More generally, this method can be implemented by any appropriately configured network node.

At step 7-1, the network node receives a message from a communication device. The message includes first information and second information. At step 7-2, the network node separates the first information from the second information. At step 7-3, the network node sends the first information without the second information to a first apparatus. Finally, at step 7-4 the network node sends the second information without the first information to a second apparatus.

Note that the communication device did not have to send separate messages to the apparatuses and therefore there is a reduction in number of messages sent by the communication device. This reduction has an effect of reducing network utilization by the communication device. As will be discussed later with reference to FIGS. 8, 9A and 9B, for the case where the communication device is a mobile device, this can lead to savings in terms of battery life as well as savings in terms of billable wireless data.

In some implementations, the communication device is a mobile device and the first information and the second information concern the location of the mobile device in a manner that is specific to the first apparatus and the second apparatus, respectively. In specific implementations, the location of the mobile device is encrypted in an apparatus-specific manner. More generally, the communication device can be mobile or non-mobile, and the first information and the second information can be any information.

In some implementations, the network node sends information to an apparatus by pushing a message including the information to the apparatus. This has been described with reference to FIG. 4 as the pushing method. In alternative implementations, the network node sends information to an apparatus by sending the information to a database from which a message including the information is sent to the apparatus upon request from the first apparatus. This has been described with reference to FIG. 4 as the polling method. Combinations of the pushing method and the polling method are possible. Other implementations are possible.

In accordance with another embodiment of the application, there is provided a non-transitory computer readable medium having computer executable instructions stored thereon for execution on a processor of a network node so as to implement any of the methods described above with reference to FIG. 7. The non-transitory computer readable medium might for example be an optical disk (e.g. CD, DVD, BD), a memory stick, a disk drive, a solid state drive, etc.

Example Test Results

Testing has been performed for a first mobile device in end to end location sharing (see for example FIG. 2) and a second mobile device in centralized location sharing (see for example FIG. 3). Each mobile device in these tests has four applications: APP1, APP2; APP3 and APP4. APP1 and APP2 are applications that report the location of the mobile device every 30 seconds, while APP3 and APP4 are applications that report the location of the mobile device only twice a day. Example test results are presented below with reference to FIGS. 8, 9A and 9B.

Figure 8:
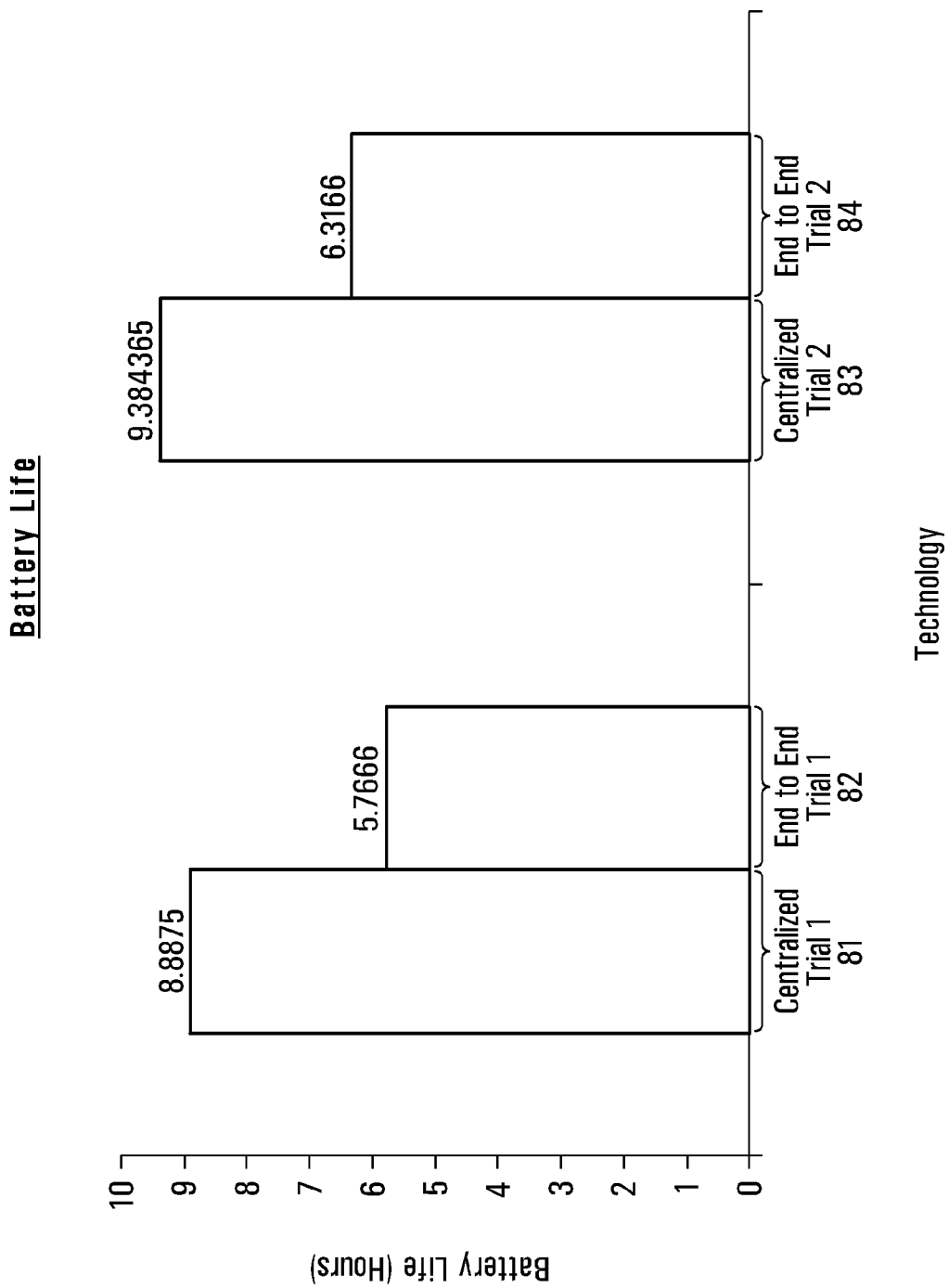
FIG. 8 is a chart showing example battery life for end to end location sharing and centralized location sharing.

Referring first to FIG. 8, shown is a chart showing example battery life for end to end location sharing and centralized location sharing. In a first trial with 3G technology, battery life is shown to be 8.8875 hours for centralized location sharing as indicated at 81 and only 5.7666 hours for end to end location sharing as indicated at 82. In a second trial with 3G technology, battery life is shown to be 9.384365 hours for centralized location sharing as indicated at 83 and only 6.3166 hours for end to end location sharing as indicated at 84.

It is to be understood that all numbers depicted in the chart are very specific for exemplary purposes only and that actual battery life may be more or less than that depicted. Notwithstanding this, it can be seen that battery life can be greater for centralized location sharing compared to end location sharing. This is primarily attributed to the fact that for the centralized location sharing the mobile device can send a single message when reporting the location of the mobile device for APP1 and APP2. Sending the single message results in less drain on battery life compared to sending two separate messages using end to end location sharing as will be explained below.

Whilst radios are designed to power down when there is no activity, this can take several seconds depending on the radio. This means that sending small bursts of data every few seconds using end location sharing can cause a radio to stay powered on and continue to consume power even when it is not actually transmitting anything. By contrast, sending larger bursts of data at larger intervals using centralized location sharing can enable a radio to power down in between transmissions. This results in less drain on battery life.

Figure 9A:
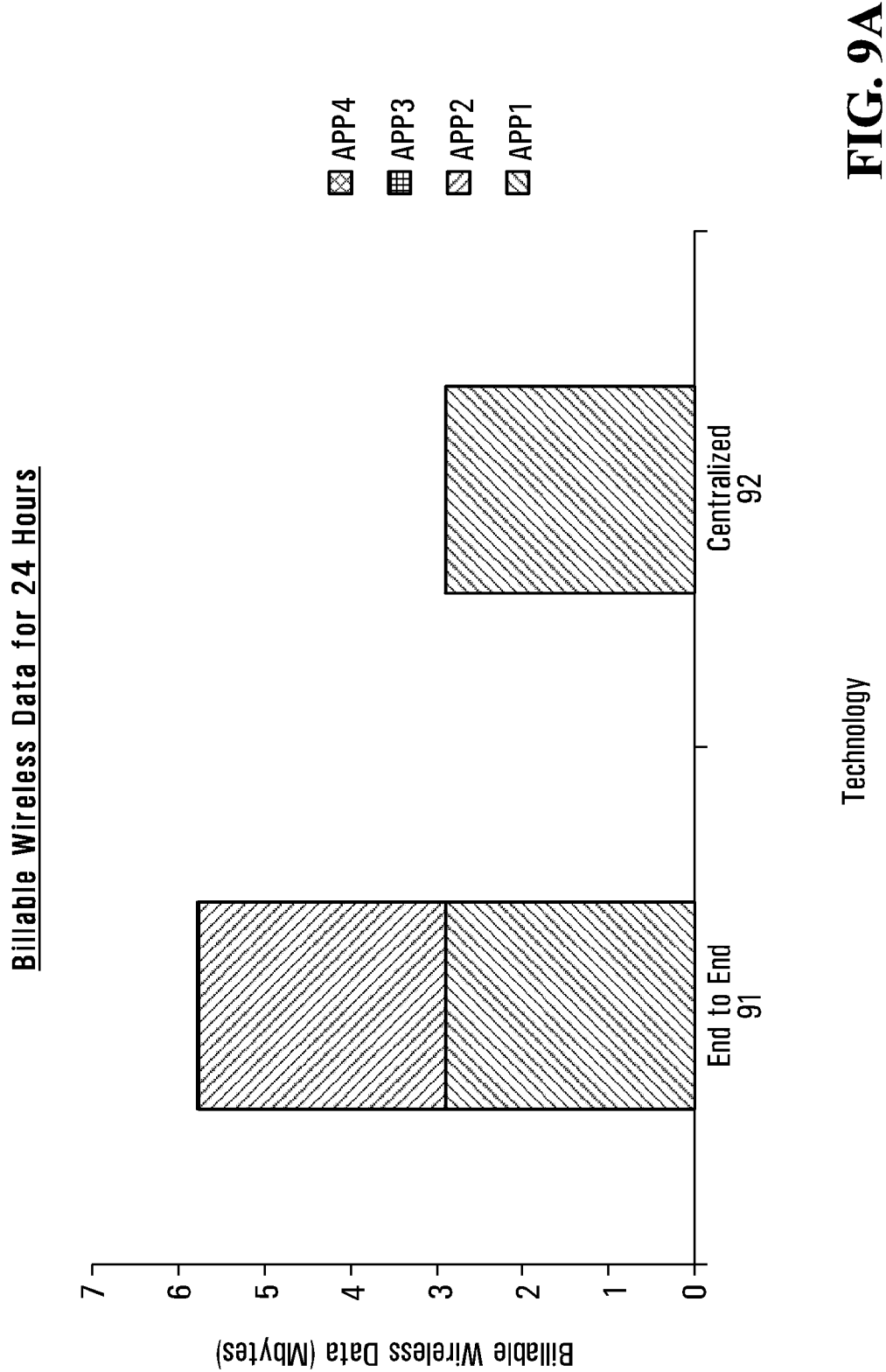
FIGS. 9A and 9B are charts showing example billable wireless data for end to end location sharing and centralized location sharing.
Figure 9B:
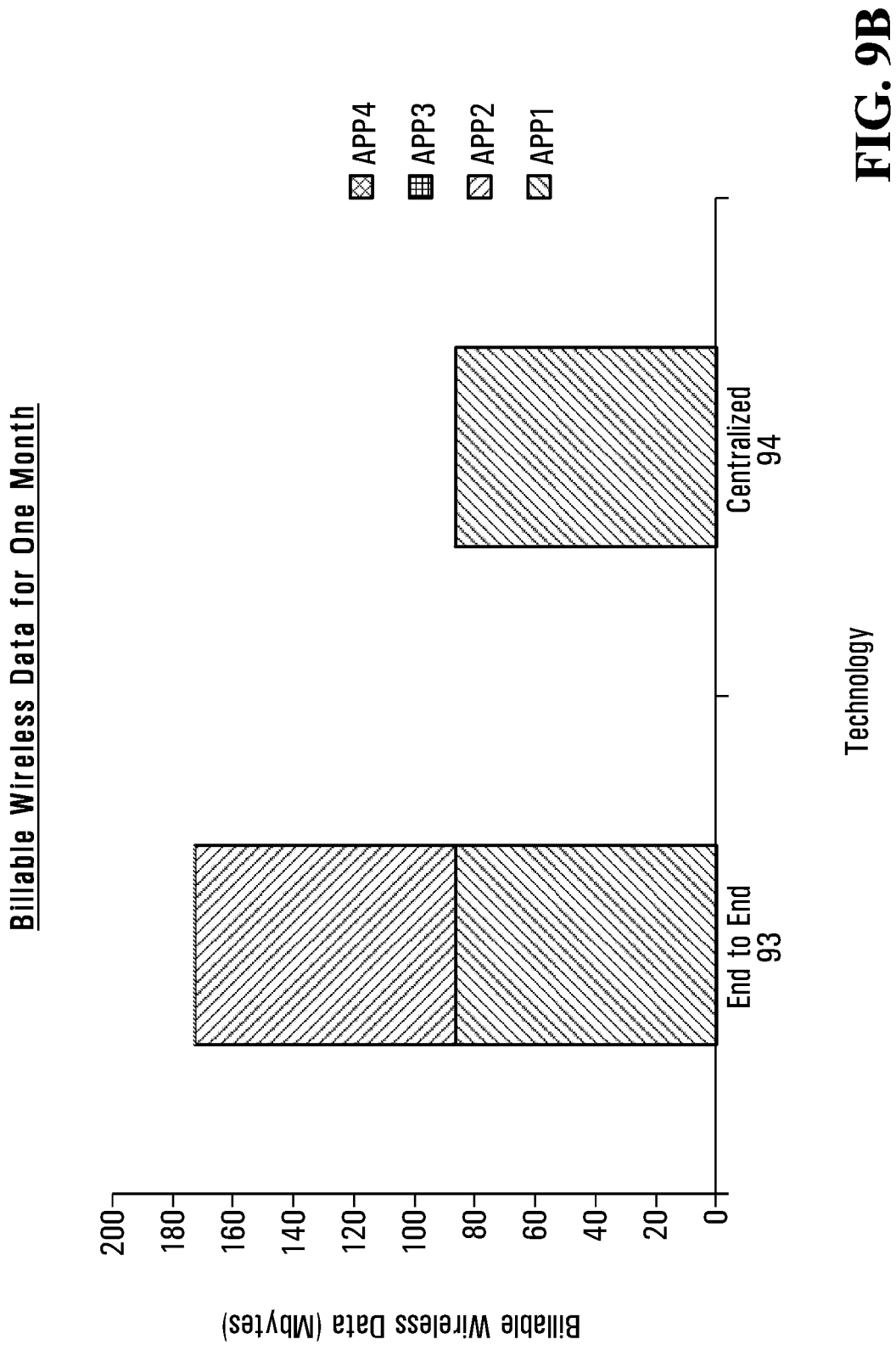

Referring now to FIGS. 9A and 9B, shown are charts showing example billable wireless data for end to end location sharing and centralized location sharing. With reference to FIG. 9A, for a 24 hour period, billable wireless data is shown to be about 5.8 Mbytes for end location sharing as indicated at 91 and only about 2.9 Mbytes for centralized location sharing as indicated at 92. With reference to FIG. 9B, for a one-month period, billable wireless data is shown to be about 172 Mbytes for end location sharing as indicated at 93 and only about 86 Mbytes for centralized location sharing as indicated at 94.

Again, it is to be understood that all numbers depicted in the charts are very specific for exemplary purposes only and that actual billable wireless data may be more or less than that depicted. Notwithstanding this, it can be seen that the amount of billable wireless data can be less for centralized location sharing compared to end location sharing. This is primarily attributed to the fact that for the centralized location sharing the mobile device can send a single message when reporting the location of the mobile device for APP1 and APP2. Sending the single message can result in less billable wireless data compared to sending two separate messages using end to end location sharing as will be explained below.

Wireless carriers typically round data usage for each data session to the nearest kilobyte for billing purposes. Thus transmitting a small amount of data (e.g. 100 bytes) incurs the same cost as transmitting 1 Kb of data. For example, if a user has five applications on his device reporting location based information independently (at around 100 bytes per update) this would result in 5Kb wireless data usage for billing purposes. If a single application reports location for all five applications in a single update (around 500 bytes per update) this would result in 1 Kb usage for billing purposes. This results in less billable wireless data.

Another Mobile Device

Figure 10:
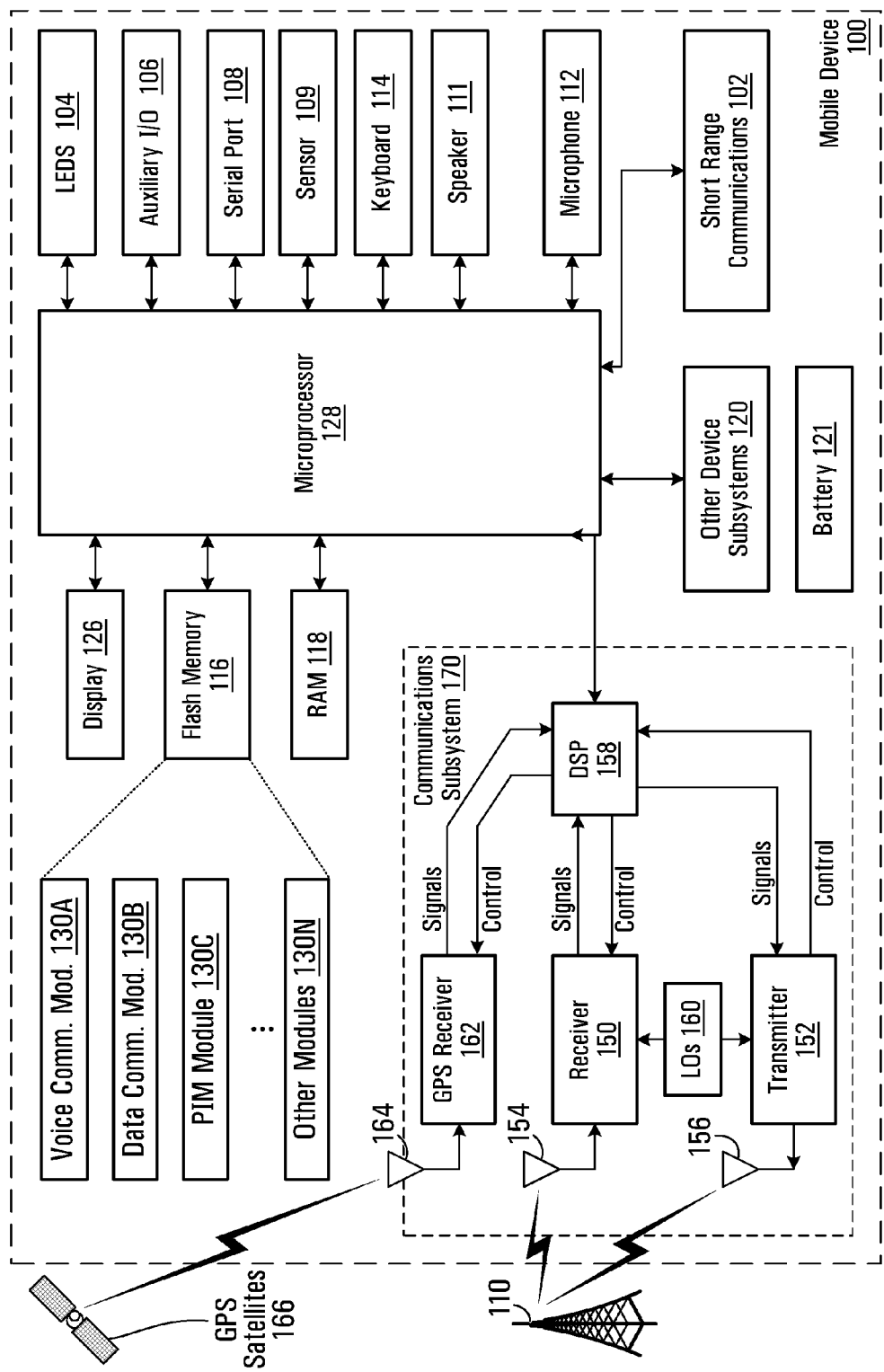
FIG. 10 is a block diagram of another mobile device.

Referring now to FIG. 10, shown is a block diagram of another mobile device 100 that may implement any of the device methods described herein. The mobile device 100 is shown with specific components for implementing features similar to those of the mobile device 20 shown in FIGS. 3 and 4. It is to be understood that the mobile device 100 is shown with very specific details for exemplary purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 is a type of processor with features similar to those of the processor 22 of the mobile device 20 shown in FIGS. 3 and 4. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture.

The software modules can for example include applications similar to the applications 21 of the mobile device 20 shown in FIGS. 3 and 4. Additionally, the software modules can include an information updater similar to the information updater 23 of the mobile device 20 shown in FIGS. 3 and 4. Note that the implementations described with reference to FIG. 10 are very specific for exemplary purposes. For example, alternative implementations are possible in which the information updater is not implemented as software and stored on the flash memory 116. More generally, the information updater may be implemented as software, hardware, firmware, or any appropriate combination thereof.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160. The communication subsystem 170 has features similar to those of the wireless access radio 25 in combination with the position determiner 24 of the mobile device 20 shown in FIGS. 3 and 4.

The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

We claim:

1. A method for execution in a mobile device, the method comprising:
   determining a location of the mobile device;
   obtaining first location based information to be sent to a first apparatus, the first location based information concerning the location of the mobile device;
   obtaining second location based information to be sent to a second apparatus when required by the second apparatus, the second location based information concerning the location of the mobile device;
   combining the first location based information and the second location based information into a message; and
   sending the message to a network node.

2. The method of claim 1, wherein:
   the first location based information is specific to the first apparatus; and the second location based information is specific to the second apparatus.

3. The method of claim 1, wherein:
determining the location of the mobile device comprises determining the location of the mobile device on an ongoing basis; and
the first apparatus and the second apparatus are first and second application servers, respectively, to which information concerning the location of the mobile device is to be sent from time to time.

4. The method of claim 3, further comprising:
for each of the first and second application servers, maintaining reporting requirements defining how frequent information concerning the location of the mobile device is to be sent to that application server; and
determining based on the reporting requirements which application server requires information concerning the location of the mobile device at a highest frequency;
wherein the message is one of a plurality of messages sent from time to time to the network node according to the highest frequency.

5. The method of claim 4, wherein each of the plurality of messages comprises:
information concerning the location of the mobile device in a manner that is specific to the application server that requires the information at the highest frequency; and
if there are any other application servers requiring information concerning the location of the mobile device at a time of the message according to the reporting requirements, for each of those application servers, information concerning the location of the mobile device in a manner that is specific to that application server.

6. The method of claim 5, wherein each of the plurality of messages further comprises:
for each of the first, second and other application servers that require information concerning the location of the mobile device, an application server identifier and a user identifier.

7. A non-transitory computer readable medium having computer executable instructions stored thereon for execution on a processor of a mobile device so as to implement the method of claim 1.

8. A mobile device comprising:
a processor;
a position determiner configured for determining a location of the mobile device; and
an information updater configured for:
obtaining first location based information to be sent to a first apparatus, the first location based information concerning the location of the mobile device;
obtaining second location based information to be sent to a second apparatus when required by the second apparatus, the second location based information concerning the location of the mobile device;
combining the first location based information and the second location based information into a message; and
sending the message to a network node.

9. The mobile device of claim 8, wherein:
the first location based information is specific to the first apparatus; and
the second location based information is specific to the second apparatus.

10. The mobile device of claim 8, wherein the position determiner is configured for:
determining the location of the mobile device by determining the location of the mobile device on an ongoing basis;
wherein the first apparatus and the second apparatus are first and second application servers, respectively, to which information concerning the location of the mobile device is to be sent from time to time.

11. The mobile device of claim 10, wherein the information updater is further configured for:
for each of the first and second application servers, maintaining reporting requirements defining how frequent information concerning the location of the mobile device is to be sent to that application server; and
determining based on the reporting requirements which application server requires information concerning the location of the mobile device at a highest frequency;
wherein the message is one of a plurality of messages sent from time to time to the network node according to the highest frequency.

12. The mobile device of claim 11, wherein each of the plurality of messages comprises:
information concerning the location of the mobile device in a manner that is specific to the application server that requires the information at the highest frequency; and
if there are any other application servers requiring information concerning the location of the mobile device at a time of the message according to the reporting requirements, for each of those application servers, information concerning the location of the mobile device in a manner that is specific to that application server.

13. The mobile device of claim 12, wherein each of the plurality of messages further comprises:
for each of the first, second and other application servers that require information concerning the location of the mobile device, an application server identifier and a user identifier.

14. A method for execution in a network node, the method comprising:
receiving a message from a mobile device, the message comprising:
first location based information for a first apparatus, the first location based information concerning the location of the mobile device; and
second location based information when required by a second apparatus, the second location based information concerning the location of the mobile device;
separating the first location based information from the second location based information;
sending the first location based information to the first apparatus; and
sending the second location based information to the second apparatus.

15. The method of claim 14, wherein at least one of:
sending the first location based information to the first apparatus comprises pushing a message comprising the first location based information to the first apparatus; and
sending the second location based information to the second apparatus comprises pushing a message comprising the second location based information to the second apparatus.

16. The method of claim 14, wherein at least one of:
sending the first location based information to the first apparatus comprises sending the first location based information to a database from which a message comprising the first location based information is sent to the first apparatus upon request from the first apparatus; and
sending the second location based information to the second apparatus comprises sending the second location based information to the database from which a message comprising the second location based information is sent to the second apparatus upon request from the second apparatus.

17. A non-transitory computer readable medium having computer executable instructions stored thereon for execution on a processor of a network node so as to implement the method of claim 14.

18. A network node comprising:
a processor; and
a data distributor configured for:
receiving a message from a mobile device, the message comprising:
first location based information for a first apparatus, the first location based information concerning the location of the mobile device; and
second location based information when required by a second apparatus, the second location based information concerning the location of the mobile device;
separating the first location based information from the second location based information;
sending the first location based information to the first apparatus; and
sending the second location based information to the second apparatus.

19. The network node of claim 18, wherein the data distributor is configured for at least one of:
sending the first location based information to the first apparatus by pushing a message comprising the first location based information to the first apparatus; and
sending the second location based information to the second apparatus by pushing a message comprising the second location based information to the second apparatus.

20. The network node of claim 18, wherein, the data distributor is configured for at least one of:
sending the first location based information to the first apparatus by sending the first location based information to a database from which a message comprising the first location based information is sent to the first apparatus upon request from the first apparatus; and
sending the second location based information to the second apparatus by sending the second location based information to the database from which a message comprising the second location based information is sent to the second apparatus upon request from the second apparatus.

* * * * *